United States Patent [19]

Ideguchi et al.

[11] Patent Number: 5,561,355

[45] Date of Patent: Oct. 1, 1996

[54] MOTOR DRIVE APPARATUS AND METHOD OF CONTROLLING THE SAME

[75] Inventors: Yoshinari Ideguchi, Nakatsu; Junkichi Yamasaki, Usa, both of Japan

[73] Assignee: Matsushita Electric Industrial Co., Ltd., Osaka, Japan

[21] Appl. No.: 141,623

[22] Filed: Oct. 27, 1993

[30] Foreign Application Priority Data

Oct. 27, 1992 [JP] Japan .................................. 4-287999

[51] Int. Cl.⁶ ...................................................... H02P 6/02
[52] U.S. Cl. .......................... 318/721; 318/432; 318/799
[58] Field of Search ..................................... 318/600, 254, 318/138, 696, 685, 715, 432, 434, 798, 799, 721, 807, 808, 809, 800, 803, 805, 722

[56] References Cited

U.S. PATENT DOCUMENTS

| | | | |
|---|---|---|---|
| 4,310,791 | 1/1982 | Akamatsu | 318/808 |
| 4,445,080 | 4/1984 | Curtiss | 318/806 |
| 4,607,355 | 8/1986 | Koide | 369/44 |
| 4,608,527 | 8/1986 | Glennon et al. | 318/685 |
| 4,672,287 | 6/1987 | Fujioka et al. | 318/800 |
| 4,882,528 | 11/1988 | Sogabe et al. | 318/600 |
| 5,157,597 | 10/1992 | Iwashita | 318/561 |
| 5,166,585 | 11/1992 | Koharagi et al. | 318/254 |
| 5,184,057 | 2/1993 | Sakai et al. | 318/803 |
| 5,187,417 | 2/1993 | Minnich et al. | 318/254 |

FOREIGN PATENT DOCUMENTS 55-77384  6/1980  Japan .

*Primary Examiner*—John W. Cabeca
*Attorney, Agent, or Firm*—Pollock, Vande Sande & Priddy

[57] ABSTRACT

A positional deviation reading sampler reads or samples a positional deviation between a target position inputted from an external device and an actual position of a motor. A position control calculator converts the positional deviation into a speed command. A speed control calculator receives a speed deviation between the speed command and an actual speed, and converts this speed deviation into a torque command to drive the motor. The position control calculator, having a function of switching a sampling interval in accordance with a level of the positional deviation, determines an optimum sampling interval for the positional deviation reading sampler. The speed control calculator performs the open-or-close control of the sampler in such a manner that the sampling interval of the positional deviation reading sampler is reduced with reducing positional deviation. With above arrangement, it becomes possible to stably drive the motor in its moving condition and position the same accurately and responsively in its stationary condition.

14 Claims, 10 Drawing Sheets

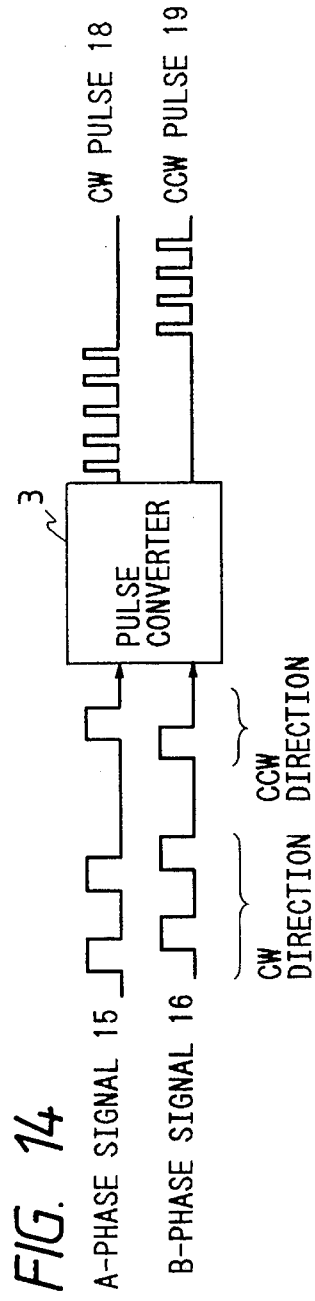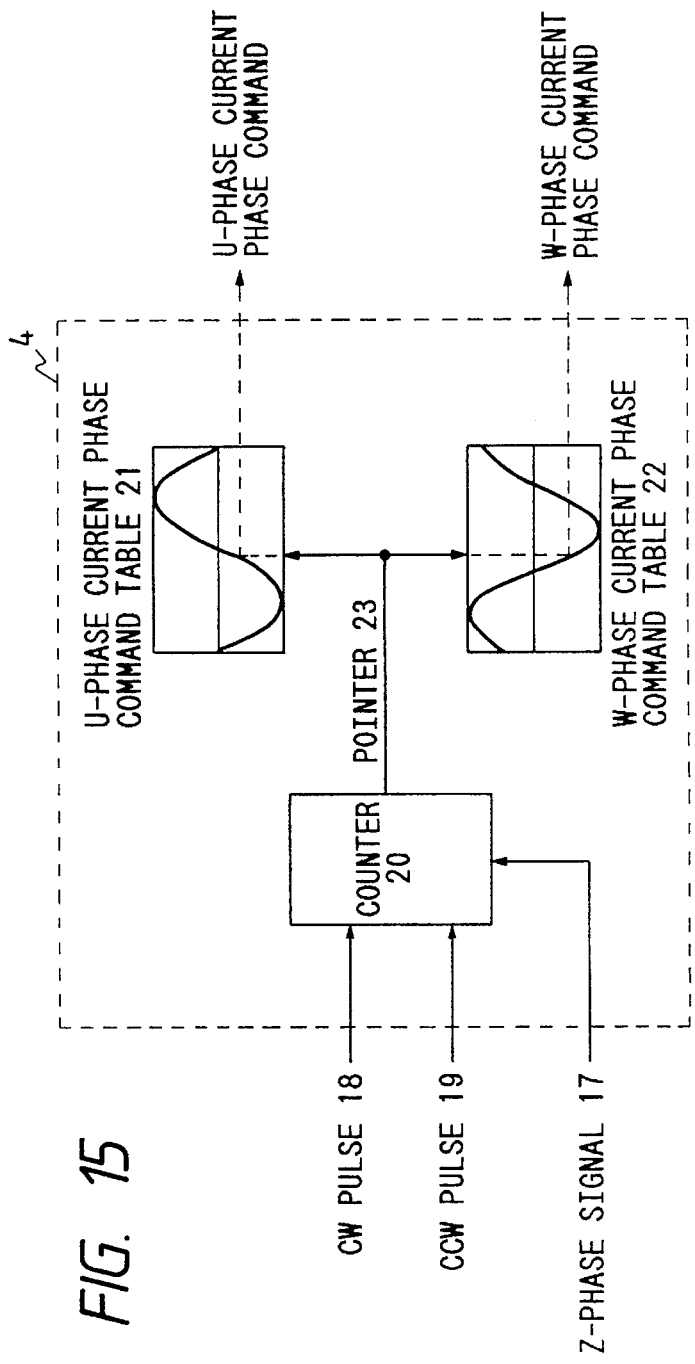
FIG. 14
FIG. 15

MOTOR DRIVE APPARATUS AND METHOD OF CONTROLLING THE SAME

BACKGROUND OF THE INVENTION

1. Field of the Invention

The present invention relates to a motor drive apparatus which is, for example, used for driving an X–Y table of a monolithic wire bonder or a die bonder serving as one of IC manufacturing apparatus, and a method of controlling the same.

2. Description of the Related Art

There is known a method of accurately stopping a motor at a target position, as disclosed in Unexamined Japanese Patent Application No. 55-77384/1980. In this prior art, after the motor passes through the target position, an error extreme point is obtained in order to determine a current value to be supplied to the motor to correct the error. Then, a rectangular current is supplied to the motor so as to eliminate the error and stop the motor at the target position.

Hereinafter, a background technology of the present invention will be explained. FIG. 10 is a block diagram showing one example of a motor drive apparatus controlling a typical three-phase synchronous motor. FIG. 11 is a detailed view showing a motor 1 of FIG. 10. FIG. 12 is a view showing inductive voltages of the motor 1 of FIG. 10. FIG. 13 is a view showing output signals from an encoder 2 shown in FIG. 10. FIG. 14 is a view showing an operation of a pulse converter 3 shown in FIG. 10. And, FIG. 15 is a detailed view showing a magnetic pole detector 4 of FIG. 10.

In FIG. 10, a reference numeral 1 represents a three-phase synchronous motor equipped with 9 slots and 6 poles. More specifically, as shown in FIG. 11, this three-phase synchronous motor comprises a stator 5 and a rotor 6. The stator 5 is associated with three coils of U-phase 7, V-phase 8, and W-phase 9 windings. This motor 1 has nine slots 10 disposed on an inside surface of the stator 5 which are spaced at intervals of 40 degrees. These nine slots 10 are wound by the coil windings in the order of U-phase, V-phase, and W-phase repetitively so as to form a star connection. On the other hand, the rotor 6 has six permanent magnet poles 11 disposed on the outer circumferential surface thereof.

An operational principle of the motor 1 will be explained below. The rotor 8 causes a magnetic field corresponding to its rotational position, which interacts with three, U-phase 7, V-phase 8, and W-phase 9, windings on the stator 5. Therefore, these three windings 7, 8, and 9 generate voltages due to Lorentz's force. Namely, three, U-phase 12, V-phase 13, and W-phase 14, inductive voltages of sine waveform are generated at intervals of 120 degrees as shown in FIG. 12 because a magnetic field to each winding is cyclically increased and decreased in response to spatial positioning of the permanent magnet 11 which cyclically approaches to and departs from each winding during one complete revolution of the rotor 6.

If sine-wave currents being in-phase with these inductive voltages of FIG. 12 are supplied to the U-phase 7, V-phase 8, and W-phase 9 windings, respectively, the rotor 6 generates a torque in a clockwise (abbreviated as CW) direction due to Fleming's left-hand rule. The magnitude of the torque generated is proportional to an amplitude of the current supplied. Moreover, if the above currents are further multiplied with −1 and delayed 180 degrees in phase before being supplied to respective windings, the rotor 6 generates a torque in a counterclockwise (abbreviated as CCW) direction.

In FIG. 10, a reference numeral 2 represents an optical encoder having three channels and installed on a rotor shaft of the motor 1. When the motor i rotates in the clockwise (CW) direction, the encoder 2 generates an A-phase signal 15 and a B-phase signal 18 having a mutual phase difference of 90 degrees therebetween as shown in FIG. 12, together with a Z-phase pulse signal 17 corresponding to one of zero-crossing 20 points of the U-phase inductive voltage 12. If the motor 1 rotates in the counterclockwise (CCW) direction, the phase relationship between the A-phase signal 15 and B-phase signal 16 are reversed. Therefore, the rotational direction of the motor 1 is easily judged by checking the phase relationship between the A-phase signal 15 and the B-phase signal 18.

A reference numeral 3 represents a pulse converter connected to the encoder 2. This pulse converter 3 converts the A-phase and B-phase signals 15 and 18 into a CW pulse signal 18 as shown in FIG. 14 when the motor 1 rotates in the clockwise direction. On the contrary, this pulse converter 3 converts the A-phase and B-phase signals 15 and 16 into a CCW pulse signal 19 as shown in FIG. 14 when the motor 1 rotates in the counterclockwise direction. A reference numeral 4 represents a magnetic pole detector comprising a counter 20, a U-phase current phase command table 21, and a W-phase current phase command table 22. As shown in FIG. 15, the counter 20 receives the signals fed from the pulse converter 3 so as to effect its count-up and count-down operations in response to the CW pulse 18 and the CCW pulse 19, respectively. Furthermore, the counter 20 is connected to the encoder 2 so as to effect its clear operation in response to the Z-phase signal 17. The U-phase current phase command table 21 memorizes the phase of the U-phase inductive voltage 12 with respect to the Z-phase signal 17 of the encoder 2. The W-phase current phase command table 22 memorizes the phase of the W-phase inductive voltage 14 with respect to the Z-phase signal 17.

An operation of the magnetic pole detector 4 will be explained below. The counter 20 is cleared at the zero-cross point of the U-phase inductive voltage 12 in response to the Z-phase signal 17 fed from the encoder 2. When the motor 1 rotates, a rotational displacement or shift amount from the above zero-cross point of the U-phase inductive voltage 12 is counted by the counter 20. The counted value becomes a pointer 23 of the U-phase current phase command table 21 for outputting a phase value of the U-phase inductive voltage 12 corresponding to the present rotational position of the motor 1. In the same manner, the counted value of the counter 20 becomes a pointer 23 of the W-phase current phase command table 22 for outputting a phase value of the W-phase inductive voltage 14 corresponding to the present rotational position of the motor 1.

The magnetic pole detector 4 is connected to two multipliers 24U, 24W so that the phase values of the U-phase and W-phase inductive voltages 12 and 14 can be multiplied with an output of a speed control calculator 25. The speed control calculator 25 outputs a torque command value, i.e. a current amplitude command value. The multipliers 24U, 24W, therefore, multiply the current amplitude command value with the U-phase and W-phase current phase command values. The resultant two outputs from respective multipliers 24U, 24W are, then, fed to two D/A converters 28U, 28W so as to generate U-phase and W-phase current commands, respectively. These U-phase and W-phase current commands are, subsequently, fed to current amplifiers 27U, 27W in which drive currents to be supplied to the U-phase winding 7 and the W-phase winding 9 are generated in response to the U-phase and W-phase current commands, respectively.

The U-phase winding 7, the V-phase winding 8, and the W-phase winding 9 are connected with each other so as to constitute a star connection; therefore, the sum of currents flowing through these three-phase windings 7, 8, and 9 becomes 0. A current command for the V-phase winding 8 is, accordingly, identical with –(U-phase current command +W-phase current command). A subtracter 28 is therefore provided to obtain a V-phase current command equal to –(U-phase current command +W-phase current command). Thus obtained V-phase current command is, thereafter, fed to another current amplifier 27V in which a drive current to be supplied to the V-phase winding 8 is generated in response to the V-phase current command.

A reference numeral 29 represents a speed detector connected to the pulse converter 3. This speed detector 29 detects the speed of the motor 1 by counting the number of pulses generated during a time measured by a timer 38 when the motor 1 rotates at a high speed and measuring an interval between successive pulses generated when the motor 1 rotates at a low speed. Reference numerals 31 and 32 represent a positive-direction position command pulse and a negative-direction position command pulse, respectively, fed from an external device. Reference numerals 33 and 34 represent subtracters.

A reference numeral 35 represents a positional deviation reading sampler which is open-or-close controlled at predetermined intervals in response to an output signal from a timer 37. A reference numeral 38 represents a speed deviation reading sampler which is open-or-close controlled at predetermined intervals in response to an output signal from the timer 38. If these samplers 35 and 38 are closed, the speed control calculator 25, the magnetic pole detector 4, the multipliers 24U, 24W, and the D/A converters 28U, 28W are activated to renew the current commands to be supplied to the current amplifiers 27U, 27W.

The subtracter 34, constituted by an up-down counter, is counted up in response to the positive-direction position command pulse S1 and is counted down in response to the negative-direction position command pulse 32. The subtracter 34 is further counted down in response to the CW pulse 18 fed from the pulse converter S and is counted up in response to the CCW pulse 19. The subtracter 34 calculates a positional deviation through these count-up and count-down operations.

A reference numeral 39 represents a position control calculator which amplifies the positional deviation obtained. The speed control calculator 25 amplifies a value supplied from the speed deviation reading sampler 38 to obtain a torque command, i.e. a current amplitude command.

An operation of the above-described motor drive apparatus will be explained below.

First of all, the subtracter 34, constituted by an up-down counter, is counted up in response to the positive-direction position command pulse 31 and counted down in response to the negative-direction position command pulse 32, and is further counted down in response to the CW pulse 18 fed from the pulse converter 3 and counted up in response to the CCW pulse 19, in order to obtain the positional deviation. Furthermore, the position control calculator 39 inputs the positional deviation through the positional deviation reading sampler 35 being open-or-close controlled by the timer 37. The position control calculator 39 amplitudes this positional deviation and outputs a speed command so as to reduce the positional deviation.

Next, the subtracter 33 subtracts this speed command by a feedback speed obtained from the speed detector 29 to generate a speed deviation. The speed control calculator 25 inputs the speed deviation through the speed deviation reading sampler 36 being-open-or-close controlled by the timer 38. The speed control calculator 25 amplitudes this speed deviation and generates a torque command, i.e. a current amplitude command.

On the other hand, when the motor 1 rotates in the clockwise (CW) direction, the encoder 2 generates the A-phase signal 15 and the B-phase signal 16 having a mutual phase difference of 90 degrees therebetween as shown in FIG. 12, together with the Z-phase pulse signal 17 corresponding to one of zero-crossing points of the U-phase inductive voltage 12. This A-phase signal 15 and B-phase signal 16 are, then, inputted into the pulse converter 3. These A-phase signal 15 and B-phase signal 16 are converted into the CW pulse 18 when the motor 1 rotates in the clockwise (CW) direction, and are converted into the CCW pulse 19 when the motor 1 rotates in the counterclockwise (CCW) direction.

Next, the CW pulse signal 18 and the CCW pulse signal 19 outputted from the pulse converter 3, and the Z-phase signal 17 outputted from the encoder 2 are supplied to the magnetic pole detector 4. The counter 20 shown in FIG. 15 is counted up by the CW pulse signal 18 and counted down by the CCW pulse signal 19. Furthermore, the counter 20 is cleared by the Z-phase signal 17 fed from the encoder 2 to be 0. Namely, an arrival of the designated zero-cross point of the U-phase inductive voltage 12 is known by checking the Z-phase signal 17. And, a displacement or shift amount of the motor 1 from the designated zero-cross point of the U-phase inductive voltage 12 is known from the count value of the counter 20. The count value of the counter 20 becomes the pointer 23 of the U-phase current phase command table 21 for outputting the phase value of the U-phase inductive voltage 12 corresponding to the present rotational position of the motor 1. Moreover, the count value of the counter 20 becomes the pointer 23 of the W-phase current phase command table 22 for outputting the phase value of the W-phase inductive voltage 14 corresponding to the present rotational position of the motor 1.

In the multipliers 24U, 24W, the phase values of the U-phase and W-phase inductive voltages 12 and 14 are multiplied with the torque command outputted from the speed control calculator 25. Namely, the multipliers 24U, 24W multiply the current amplitude command value with the U-phase and W-phase current phase command values, respectively. The resultant two outputs from respective multipliers 24U, 24W are, then, fed to two D/A converters 26U, 26W so as to generate U-phase and W-phase current commands, respectively. These U-phase and W-phase current commands are, subsequently, fed to current amplifiers 27U, 27W in which the drive currents to be supplied to the U-phase winding 7 and the W-phase winding 9 are generated in response to the U-phase and W-phase current commands, respectively.

On the other hand, the subtracter 28 obtains the current command for the V-phase winding 8 by calculating the value identical with –(U-phase current command +W-phase current command). Thus obtained V-phase current command is, thereafter, fed to the current amplifier 27V in which the drive current to be supplied to the V-phase winding 8 is generated in response to the V-phase current command.

If the torque command is a positive value, the motor 1 generates a torque in the clockwise (CW) direction. On the contrary, if the torque command is a negative value, the motor 1 generates a torque in the counterclockwise (CCW) direction because the multipliers 24U and 24W generate U-phase and W-phase current commands having 180-degree phase difference with respect to respective U-phase and W-phase current phase commands. Thus, the speed deviation is decreased. In accordance with the reduction of the speed deviation, the positional deviation becomes small.

FIG. 9(A) shows a sampling interval of the speed deviation reading sampler 36 applied to both moving and stationary conditions of the motor 1. FIG. 9(B) shows a sampling interval of the positional deviation reading sampler 35 applied to both moving and stationary conditions of the motor 1.

When the motor 1 is in a moving condition, in order to stabilize the motor drive operation by the above-described motor drive apparatus, the speed control must be performed by using three times or more sampling with respect to the calculated speed command as shown in FIG. 9. The reason why three times or more sampling are required when the motor 1 is in a moving condition is as follows.

If the speed command sampling interval is identical with the control sampling interval in the speed control operation, the motor 1 will not be able to sufficiently follow up the speed command because, even if the speed of the motor 1 is controlled to coincide with the speed command value, the speed command value itself may vary at the next coming control sampling timing. Thus, the speed of the motor 1 cannot be stabilized. Especially, as the positional command varies widely when the motor 1 is in a moving condition, the speed command will correspondingly cause wide variation. Hence, three times or more sampling are required for allowing the motor 1 to follow up the speed command. For this reason, the speed of the timer 37 is set ⅓ or less compared with that of the timer 38.

In accordance with the above motor drive apparatus, the sampling interval of the positional deviation reading sampler 35 will be sufficiently extended or elongated so as to stabilize the motor speed control during the moving condition of the motor. However, when the motor 1 is in a stationary condition, the sampling interval of the positional deviation reading sampler 35 will be too long to accurately detect a small positional deviation if this small positional deviation varies at a period smaller than that of the positional deviation reading sampler 35. Consequently, there is a problem that the positioning control cannot be accurately and responsively performed when the motor is in a stationary condition.

SUMMARY OF THE INVENTION

Accordingly, in view of above-described problems encountered in the background art, an object of the present invention is to provide a motor drive apparatus and a method of controlling the same which allows the motor to accurately and responsively follow up the target position regardless of the speed of the motor.

In order to accomplish the above purpose, a first aspect of the present invention provides a motor drive apparatus comprising: position detecting means for detecting an actual rotational position of a motor; speed detecting means for detecting an actual rotational speed of said motor; position control means for generating a speed command of said motor on the basis of a difference between a target rotational position inputted from an external means and the actual rotational position detected by said position detecting means; speed control means for generating a torque command of said motor on the basis of a difference between said speed command generated from said position control means and said actual rotational speed detected by said speed detecting means; driving means for driving said motor in accordance with said torque command generated from said speed control means; and changing means for changing a ratio of a frequency of generating said speed command to a frequency of generating said torque command in accordance with the actual rotational speed of the motor detected by said speed detecting means.

Furthermore, a second aspect of the present invention provides a motor controlling method comprising steps of: generating a speed command of a motor on the basis of a difference between a target rotational position inputted from an external means and an actual rotational position; generating a torque command of said motor on the basis of a difference between said speed command and an actual rotational speed; driving said motor in accordance with said torque command; and changing a ratio of a frequency of generating said speed command to a frequency of generating said torque command in accordance with the actual rotational speed of said motor.

With above arrangement, it becomes possible to change the ratio of a frequency of generating the speed command to a frequency of generating the torque command between moving and stationary conditions of the motor. Accordingly, the motor can be stably driven in its moving condition and positioned accurately and responsively in its stationary condition.

The above and other objects, features and advantages of the present invention will become more apparent from the following detailed description which is to be read in conjunction with the accompanying drawings.

BRIEF DESCRIPTION OF THE DRAWINGS

FIG. 14 is a view showing an operation of a pulse converter shown in FIG. 10; and FIG. 15 is a detailed view showing a magnetic pole detector of FIG. 10.

DETAILED DESCRIPTION OF THE PREFERRED EMBODIMENT

Figure 1:
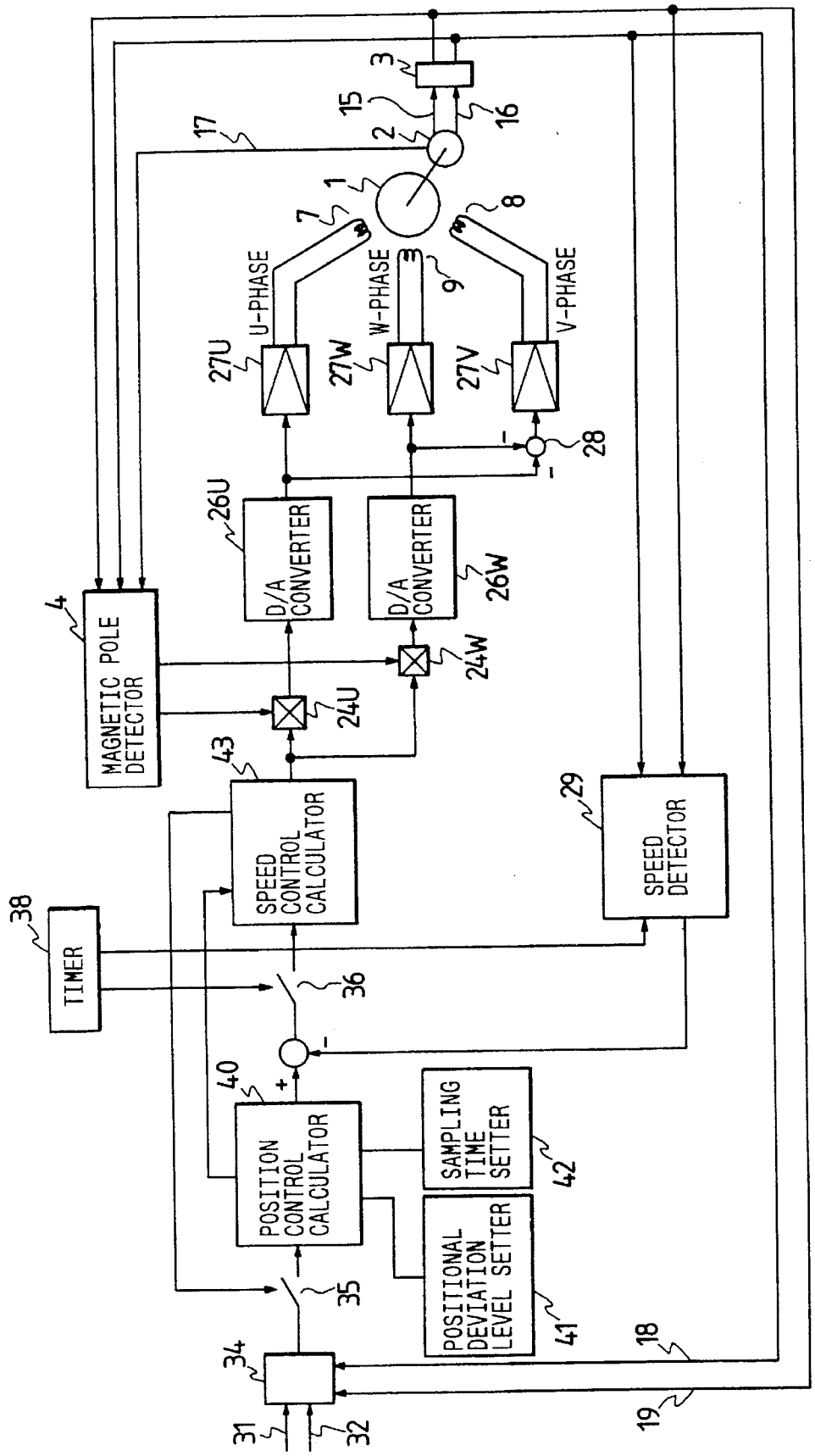
FIG. 1 is a block diagram showing one example of a motor drive apparatus for a three-phase synchronous motor in accordance with the present invention.

Hereinafter, a preferred embodiment of the present invention will be explained in detail with reference to accompanying drawings wherein the same reference numerals are applied to like parts.

Figure 2:
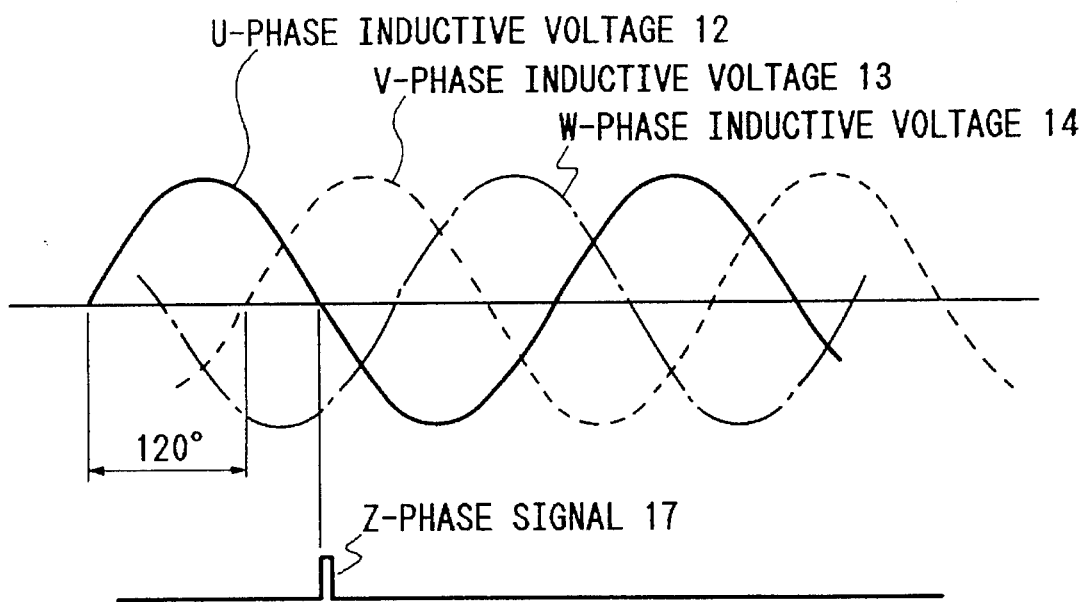
FIG. 2 is a view showing inductive voltages of the motor of FIG. 1.
Figure 3:
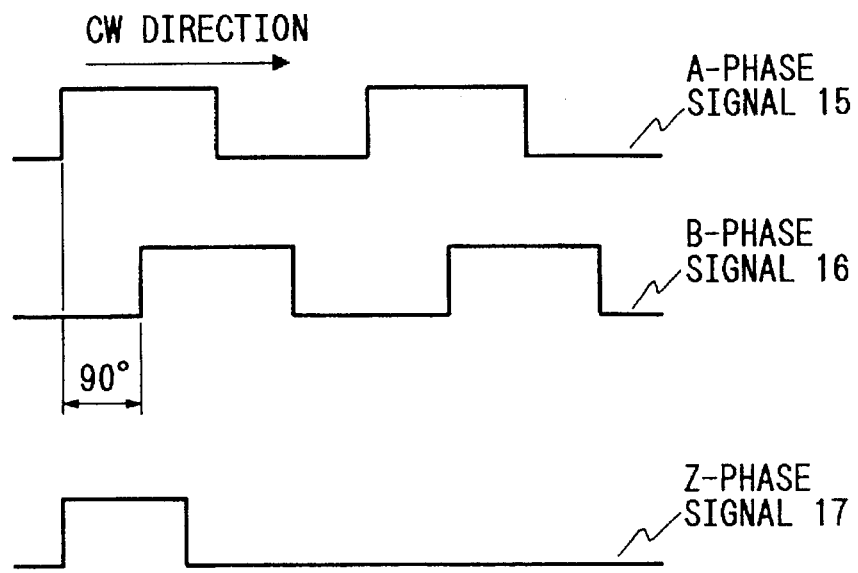
FIG. 3 is a view showing output signals from an encoder shown in FIG. 1.
Figure 4:
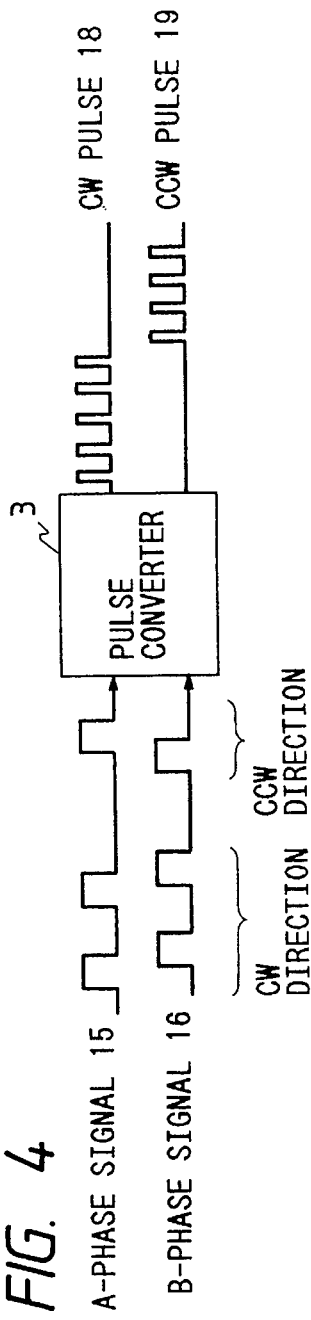
FIG. 4 is a view showing an operation of a pulse converter shown in FIG. 1.
Figure 5:
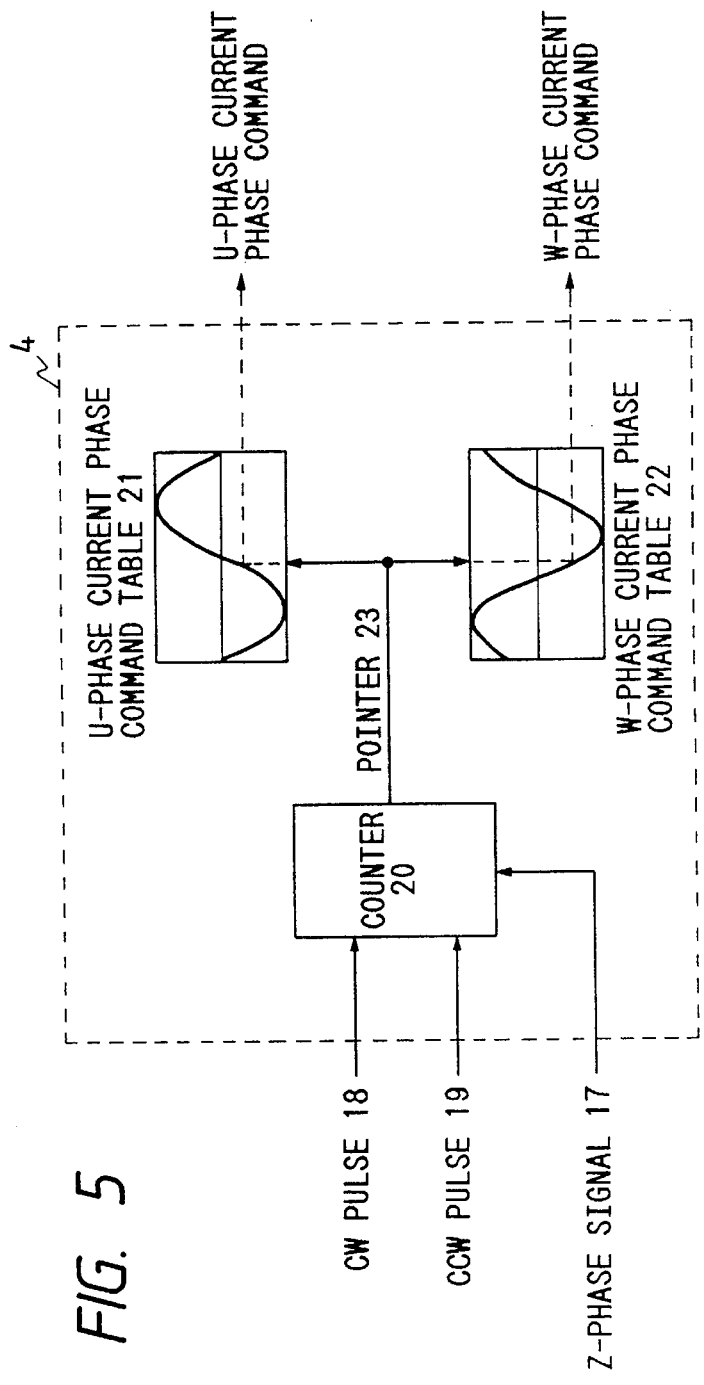
FIG. 5 is a detailed view showing a magnetic pole detector of FIG. 1.

FIG. 1 is a block diagram showing one example of a motor drive apparatus for a three-phase synchronous motor in accordance with the present invention. FIG. 2 is a view showing inductive voltages of the motor 1 of FIG. 1. FIG. 3 is a view showing output signals from an encoder 2 shown in FIG. 1. FIG. 4 is a view showing an operation of a pulse converter 3 shown in FIG. 1. And, FIG. 5 is a detailed view showing a magnetic pole detector 4 of FIG. 1.

In FIG. 1, a reference numeral 1 represents a three-phase synchronous motor used for driving an X–Y table of a monolithic wire bonder. During one complete revolution of the rotor of the motor 1, three, U-phase 12, V-phase 13, and W-phase 14, inductive voltages of sine waveform are generated at intervals of 120 degrees as shown in FIG. 2. A reference numeral 2 represents an optical encoder having three channels and installed on a rotor shaft of the motor 1. When the motor 1 rotates in the clockwise (CW) direction, the encoder 2 generates an A-phase signal 15 and a B-phase signal 16 having a mutual phase difference of 90 degrees therebetween as shown in FIG. 3, together with a Z-phase pulse signal 17 corresponding to one of zero-crossing points of the U-phase inductive voltage 12 as shown in FIG. 2. If the motor 1 rotates in the counterclockwise (CCW) direction, the phase relationship between the A-phase signal 15 and B-phase signal 16 are reversed. Therefore, the rotational direction of the motor 1 is known by checking the phase relationship between the A-phase signal 15 and the B-phase signal 16.

A reference numeral 3 represents a pulse converter connected to the encoder 2. This pulse converter 3 converts the A-phase and B-phase signals 15 and 16 into a CW pulse signal 18 as shown in FIG. 4 when the motor 1 rotates in the clockwise (CW) direction. On the contrary, this pulse converter 3 converts the A-phase and B-phase signals 15 and 18 into a CCW pulse signal 19 as shown in FIG. 4 when the motor 1 rotates in the counterclockwise (CCW) direction. A reference numeral 4 represents a magnetic pole detector comprising a counter 20, a U-phase current phase command table 21, and a W-phase current phase command table 22. As shown in FIG. 5, the counter 20 receives the signals fed from the pulse converter 3 so as to effect its count-up and count-down operations in response to the CW pulse signal 18 and the CCW pulse signal 19, respectively. Furthermore, the counter 20 is connected to the encoder 2 so as to effect its clear operation in response to the Z-phase signal 17. The U-phase current phase command table 21 memorizes the phase of the U-phase inductive voltage 12 with respect to the Z-phase signal 17 of the encoder 2. The W-phase current phase command table 22 memorizes the phase of the W-phase inductive voltage 14 with respect to the Z-phase signal 17.

An operation of the magnetic pole detector 4 will be explained below. The counter 20 is cleared at the designated zero-cross point of the U-phase inductive voltage 12 in response to the Z-phase signal 17 fed from the encoder 2. When the motor 1 rotates, a rotational displacement or shift amount from the above zero-cross point of the U-phase inductive voltage 12 is counted by the counter 20. The counted value becomes a pointer 23 of the U-phase current phase command table 21 for outputting a phase value of the U-phase inductive voltage 12 corresponding to the present rotational position of the motor 1. In the same manner, the counted value of the counter 20 becomes a pointer 23 of the W-phase current phase command table 22 for outputting a phase value of the W-phase inductive voltage 14 corresponding to the present rotational position of the motor 1.

The magnetic pole detector 4 is connected to two multipliers 24U, 24W so that the phase values of the U-phase and W-phase inductive voltages 12 and 14 can be multiplied with an output of a speed control calculator 43. The speed control calculator 43 outputs a torque command value, i.e. a current amplitude command value. The multipliers 24U, 24W, therefore, multiply the current amplitude command value with the U-phase and W-phase current phase command values (i.e. the phase values of the U-phase and W-phase inductive voltages 12 and 14 outputted from the magnetic pole detector 4).

Resultant two outputs from respective multipliers 24U, 24W are, then, fed to two D/A converters 26U, 26W so as to generate U-phase and W-phase current commands, respectively. These U-phase and W-phase current commands are, subsequently, fed to current amplifiers 27U, 27W in which drive currents to be supplied to the U-phase 7 and the W-phase 9 windings are generated in response to the U-phase and W-phase current commands, respectively.

The U-phase winding 7, the V-phase winding 8, and the W-phase winding 9 are connected with each other so as to constitute a star connection; therefore, the sum of currents flowing through these three-phase windings 7, 8, and 9 becomes 0. A current command for the V-phase winding 8 is, accordingly, identical with −(U-phase current command +W-phase current command). A subtracter 28 is therefore provided to obtain a V-phase current command equal to −(U-phase current command +W-phase current command). Thus obtained V-phase current command is, thereafter, fed to another current amplifier 27V in which a drive current to be supplied to the V-phase winding 8 is generated in response to the V-phase current command.

A reference numeral 29 represents a speed detector connected to the pulse converter 3. This speed detector 29 detects an actual speed of the motor 1 by counting the number of pulses generated during a time measured by a timer 38 when the motor 1 rotates at a high speed and measuring an interval between successive pulses generated when the motor 1 rotates at a low speed. Reference numerals 31 and 32 represent a positive-direction position command pulse and a negative-direction position command pulse, respectively, fed from an external device as target position values. Reference numerals 33 and 34 represent subtracters.

A reference numeral 35 represents a positional deviation reading sampler which is open-or-close controlled in response to a sampler on-off signal fed from the speed control calculator 43. A reference numeral 36 represents a speed deviation reading sampler which is open-or-close controlled in response to an output signal fed from the timer 38. If the sampler 36 is closed in response to the output signal from the timer 38, the speed control calculator 43, the magnetic pole detector 4, the multipliers 24U, 24W, and the D/A converters 26U, 26W are activated to renew the current commands to be supplied to the current amplifiers 27U, 27W.

The subtracter 34, constituted by an up-down counter, is counted up in response to the positive-direction position command pulse 31 and is counted down in response to the negative-direction position command pulse 32. The subtracter 34 is further counted down in response to the CW pulse signal 18 fed from the pulse converter 3 and is counted up in response to the CCW pulse signal 19. Thus, the subtracter 34 calculates a positional deviation through these count-up and count-down operations.

The calculated positional deviation is supplied to a position control calculator 40 under the open-or-close control of the positional deviation reading sampler 35. The position control calculator 40 amplifies the positional deviation obtained. The speed control calculator 43 amplifies a value supplied from the speed deviation reading sampler 36 to obtain a torque command, i.e. a current amplitude command.

The present embodiment is characterized in that the sampling interval of the positional deviation reading sampler 35 is changed or switched in accordance with a level or magnitude of the positional deviation. For realizing this interval change of the positional deviation reading sampler 35, the position control calculator 40 is connected to a positional deviation level setter 41 and a sampling time setter 42. The positional deviation level setter 41 determines a positional deviation level according to which the sampling interval of the positional deviation reading sampler 35 is changed or switched. The sampling time setter 42 designates the sampling interval of the positional deviation reading sampler 35. The position control calculator 40 compares a level of the positional deviation calculated in the subtracter 34 with the level of the positional deviation level setter 41. In accordance with the comparison result, the position control calculator 40 supplies the speed control calculator 43 with an appropriate sampling interval for the positional deviation reading sampler 35 with reference to the data being stored in the sampling time setter 42.

The speed control calculator 43 performs a calculation for obtaining the torque command at the intervals identical with the sampling intervals of the speed deviation reading sampler 36. Thereafter, the speed control calculator 43 outputs the sampler on-off signal to the positional deviation reading sampler 35 to open-or-close control the same.

An operation of the above-described motor drive apparatus in accordance with the present invention will be explained below.

Figure 6:
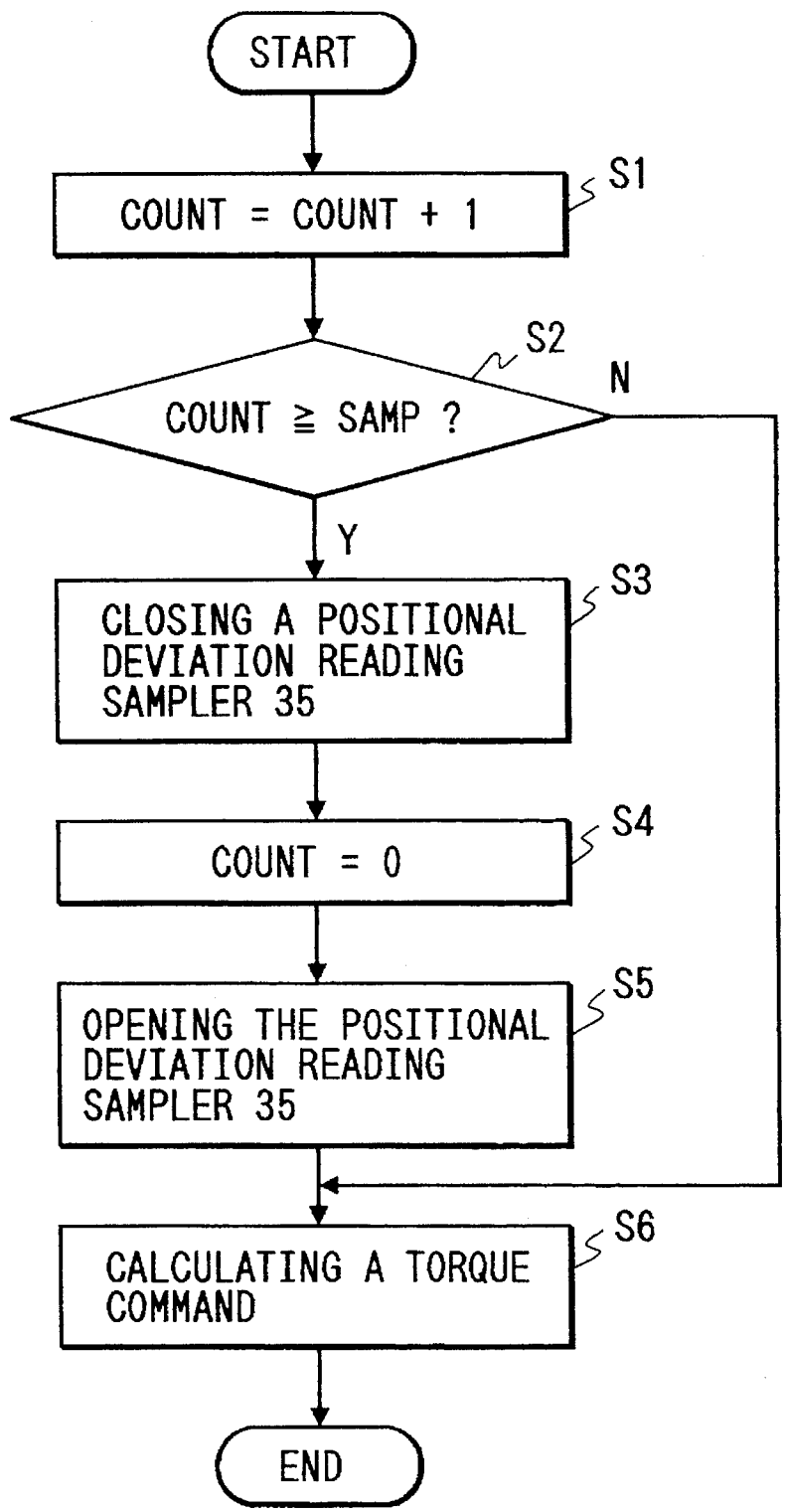
FIG. 6 is a flowchart showing a processing in a speed control calculator.
Figure 7:
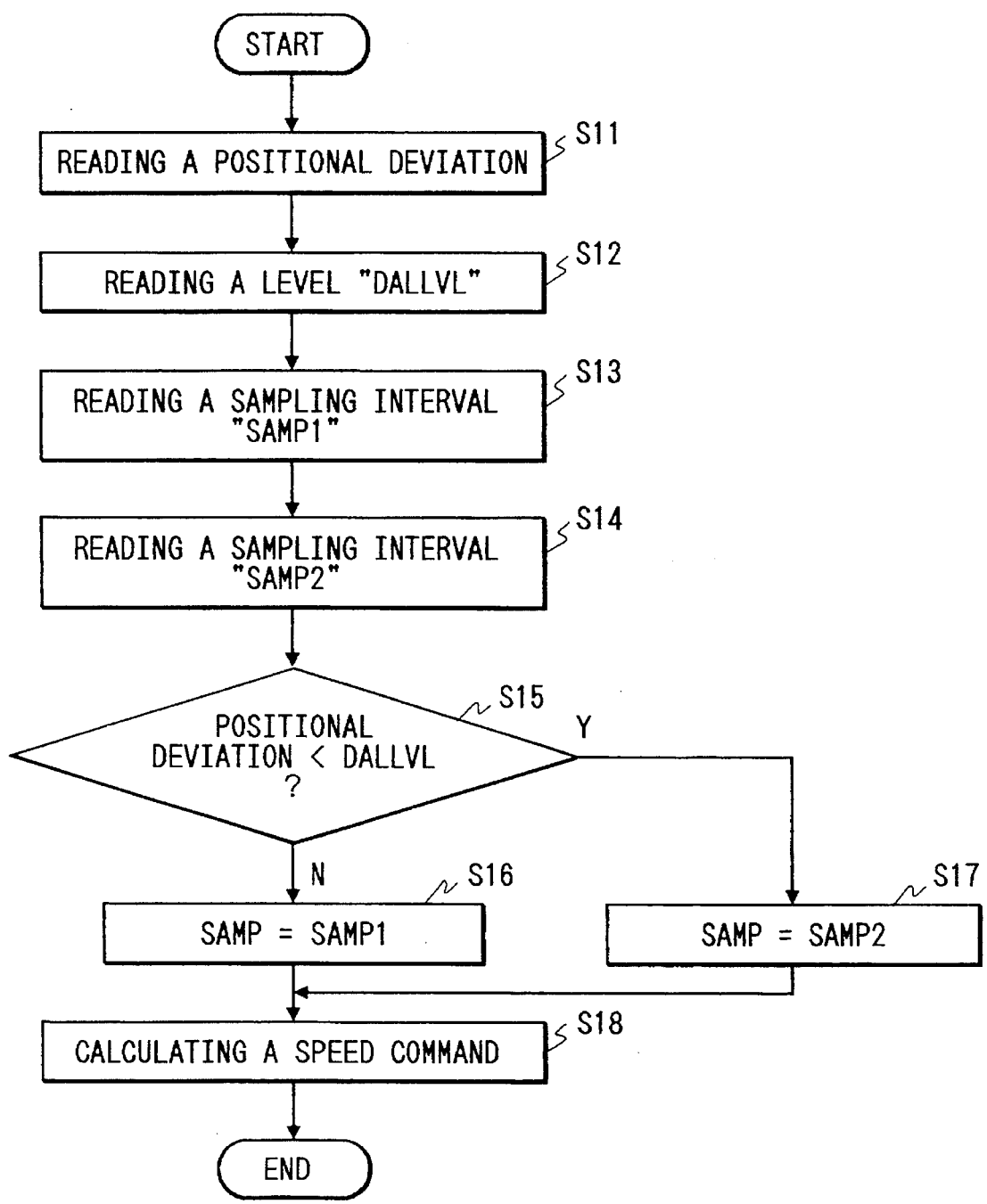
FIG. 7 is a flowchart showing a processing in a position control calculator.

FIG. 6 is a flowchart showing the processing in the speed control calculator 43, and FIG. 7 is a flowchart showing the processing in the position control calculator 40.

First of all, in the sampling time setter 42 of FIG. 1, two sampling intervals are set for the positional deviation reading sampler 35 so that a ratio of these two sampling intervals is a predetermined value. One is a sampling interval of the positional deviation reading sampler 35 used when the motor 1 is in a moving condition. The other is a sampling interval of the positional deviation reading sampler 35 used when the motor 1 is in a stationary condition. In this embodiment, the former sampling interval is set to be three times as the long as latter sampling interval.

Furthermore, in the positional deviation level setter 41, the positional deviation level is set for changing or switching the sampling interval of the positional deviation reading sampler 35. After finishing the setting of the above values, the control of the motor 1 is initiated.

If the above setting is completed, the motor drive apparatus receives the positive-direction position command pulse 31 and the negative-direction position command pulse 32 fed from the external device.

The subtracter 34, constituted by an up-down counter, is counted up in response to the positive-direction position command pulse 31 and counted down in response to the negative-direction position command pulse 32, and is further counted down in response to the CW pulse signal 18 fed from the pulse converter 3 and counted up in response to the CCW pulse signal 19, in order to obtain the positional deviation. Furthermore, the position control calculator 40 inputs the positional deviation through the positional deviation reading sampler 35 being open-or-close controlled by the speed control calculator 43. The position control calculator 40 amplitudes this positional deviation and outputs a speed command so as to reduce the positional deviation.

Next, the subtracter 33 subtracts this speed command by a feedback speed obtained from the speed detector 29 to generate a speed deviation. The speed control calculator 43 inputs the speed deviation through the speed deviation reading sampler 36 being open-or-close controlled by the timer 38. The speed control calculator 43 amplitudes this speed deviation and generates a torque command, i.e. a current amplitude command.

Operations of the position control calculator 40 and the speed control calculator 43 will be explained below.

First of all, when the speed deviation reading sampler 36 is closed in response to the output signal from the timer 38, the speed control calculator 43 initiates its operation. The speed control calculator 43 opens or closes the positional deviation reading sampler 35 on the basis of the sampling time being initially set by the sampling time setter 42 and, furthermore, calculates the torque command on the basis of the signal fed through the speed deviation reading sampler 36.

On the other hand, if the positional deviation reading sampler 35 is closed, the position control calculator 40 initiates its operation so as to calculate a speed command on the basis of the positional deviation fed through the positional deviation reading sampler 35. Moreover, the position control calculator 40 compares the positional deviation with the reference value set by the positional deviation level setter 41 so as to output an appropriate sampling interval to the speed control calculator 43 with reference to the data being set in the sampling time setter 42.

The speed control calculator 43 performs the open-or-close control of the positional deviation reading sampler 35 in accordance with the signal fed from the position control calculator 40.

Next, the details of the processing of the speed control calculator 43 will be explained with reference to the flowchart of FIG. 6. When the speed deviation reading sampler 36 is closed, a count value (COUNT) is incremented in a step S1. This count value COUNT represents a count number of the counter which constitutes a part of the speed control calculator 43 for counting the number of calculations of obtaining the torque command. Next, in a step S2, the count value COUNT is compared with a sampling value (SAMP). This value SAMP represents a value selected by the sampling time setter 42 in response to the positional deviation.

If the count value COUNT is equal to or larger than the value SAMP, the positional deviation reading sampler 35 is closed in a step 33 so as to allow the position control calculator 40 to read the positional deviation through the sampler 35. After finishing the reading operation of the positional deviation through the sampler 35, the count value COUNT is cleared to 0 in a step S4. Thereafter, the positional deviation reading sampler 35 is opened in a step S5. Subsequently, the torque command is calculated in a step S6. On the other hand, when the count value COUNT is smaller than the value SAMP in the comparison of the step S2, the calculation of the torque command is directly performed in the step S6 without performing the processing of the steps S3–S5.

Next, the details of the processing of the position control calculator 40 will be explained with reference to the flowchart of FIG. 7. When the positional deviation reading sampler 35 is closed by the speed control calculator 43, a present value of the positional deviation is read through this positional deviation reading sampler 35 in a step S11. Next, in a step S12, a positional deviation level "DALLVL" is read from the positional deviation level setter 41. This positional deviation level "DALLVL" is used as a reference value for selecting an appropriate value from the sampling time setter 42. Next, in steps S13 and S14, a sampling interval "SAMP1" and a sampling interval "SAMP2" are successively read from the sampling time setter 42. The sampling interval "SAMP1" represents a sampling interval of the positional deviation reading sampler 35 exclusively used for the moving condition of the motor 1. On the other hand, the sampling interval "SAMP2" represents a sampling interval of the positional deviation reading sampler 35 exclusively used for the stationary condition of the motor 1.

Thereafter, in a step S15, the present positional deviation read in the above step S11 is compared with the reference value DALLVL. If the present positional deviation is equal to or larger than the reference value DALLVL, the position control calculator 40 proceeds to a step S16 wherein the sampling interval SAMP1 is determined or specified as the sampling interval SAMP used in the step S2 of FIG. 6. On the contrary, if the present positional deviation is smaller than the reference value DALLVL, the position control calculator 40 proceeds to a step S17 wherein the sampling interval SAMP2 is determined or specified as the sampling interval SAMP used in the step S2 of FIG. 6. Thereafter, in a step S18, a speed command is calculated based on the positional deviation.

Figure 8A:
FIG. 8(A) is a time chart showing a sampling interval of a speed deviation reading sampler in a stationary condition of the motor in accordance with the one embodiment of the present invention.
Figure 8B:
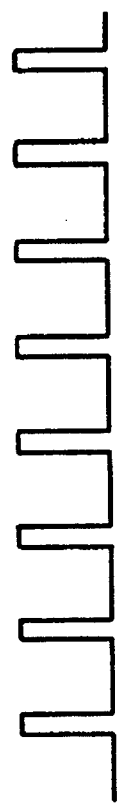
FIG. 8(B) is a time chart showing a sampling interval of a positional deviation reading sampler in the stationary condition of the motor in accordance with the one embodiment of the present invention.
Figure 9A:
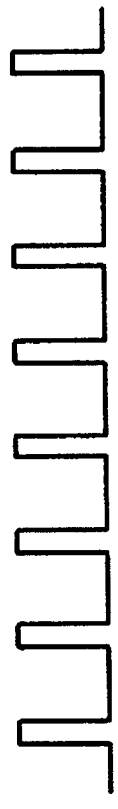
FIG. 9(A) is a time chart showing a sampling interval of the speed deviation reading sampler in a moving condition of the motor in accordance with the one embodiment of the present invention, which is also applied to the sampling interval of the speed deviation reading sampler in both moving and stationary conditions of the motor in the above-described background art.
Figure 9B:
FIG. 9(B) is a time chart showing a sampling interval of a positional deviation reading sampler in the moving condition of the motor in accordance with the one embodiment of the present invention, which is also applied to the sampling interval of the positional deviation reading sampler in both moving and stationary conditions of the motor in the above-described background art.
Figure 10:
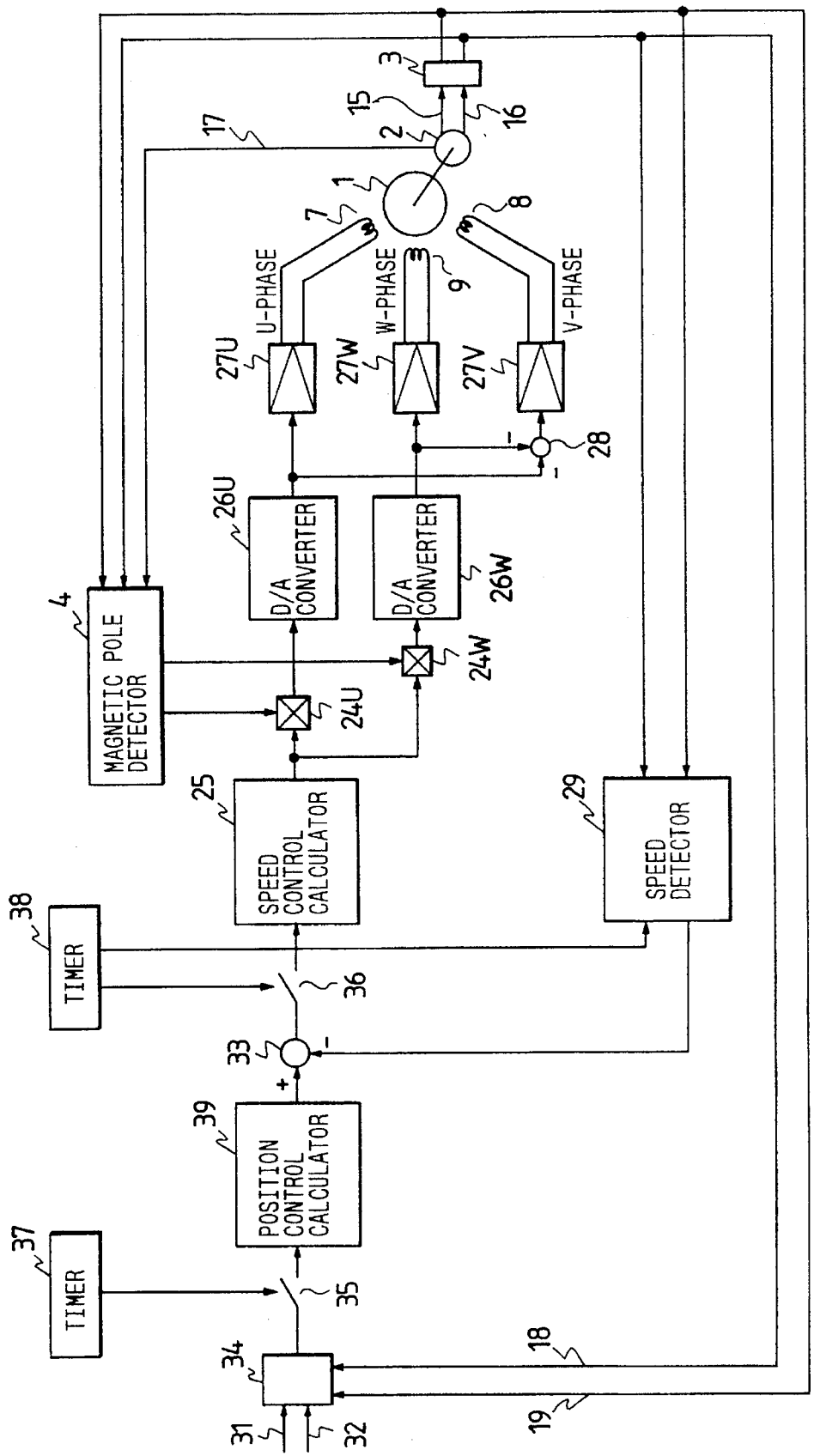
FIG. 10 is a block diagram showing one example of a motor drive apparatus controlling a typical prior art three-phase synchronous motor.
Figure 11:
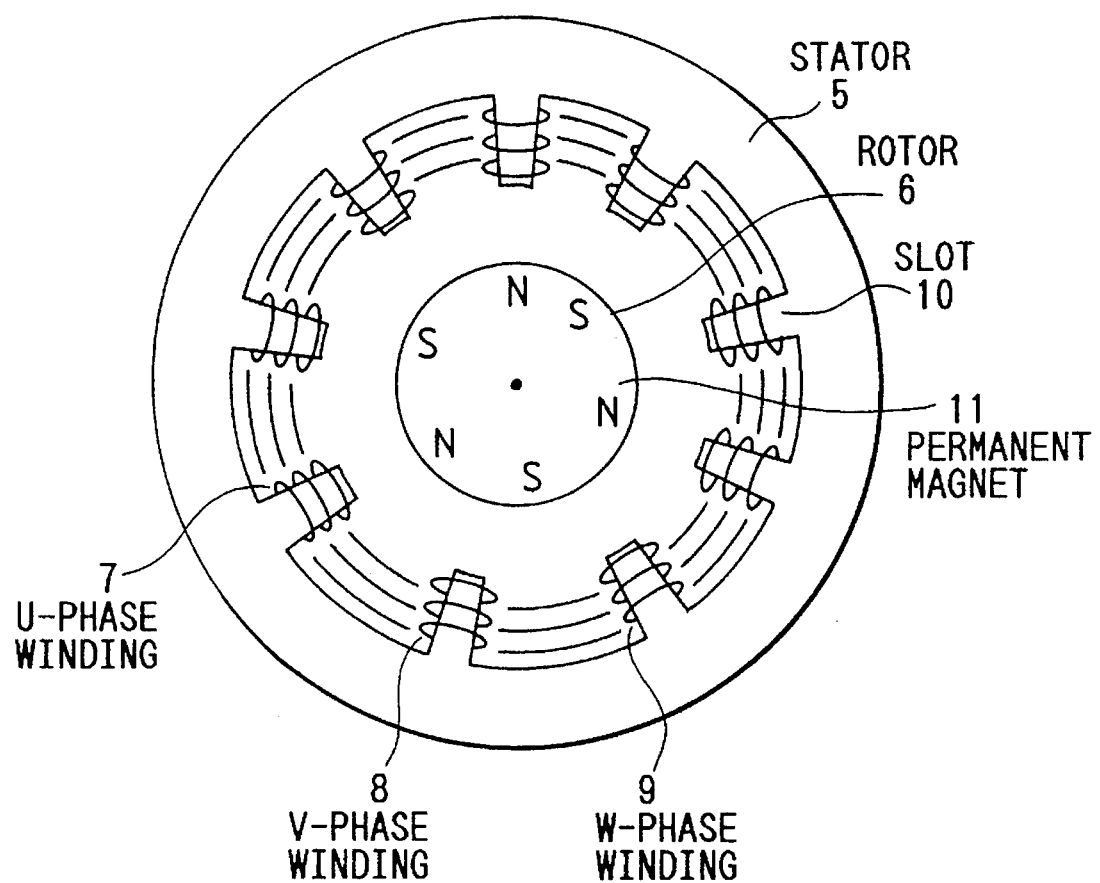
FIG. 11 is a detailed view showing a motor shown in FIG. 10.
Figure 12:
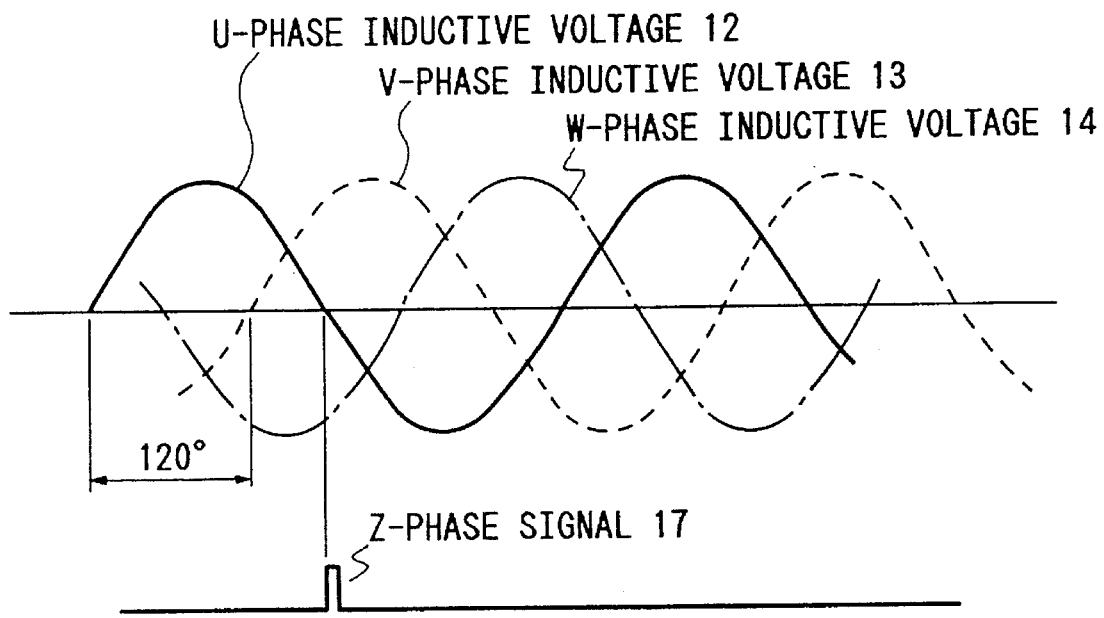
FIG. 12 is a view showing inductive voltages of the motor of FIG. 10.
Figure 13:
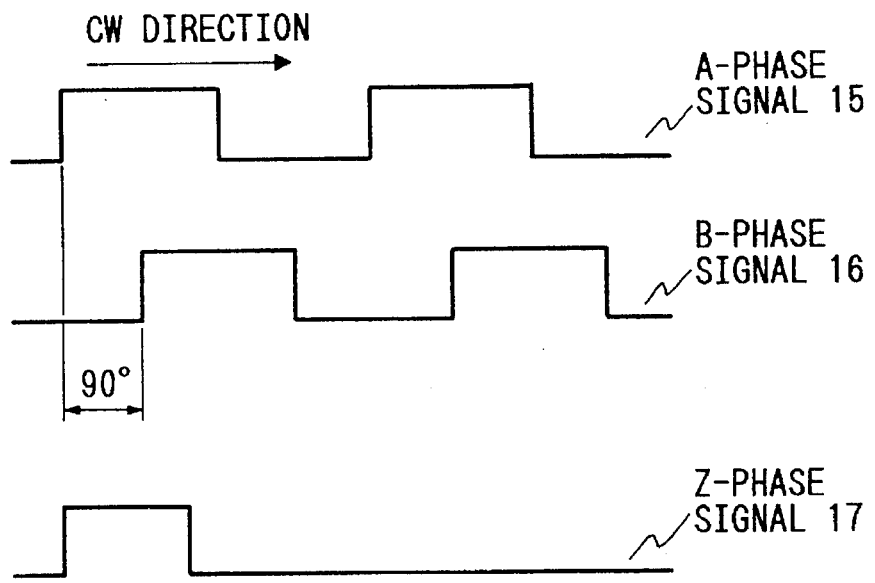
FIG. 13 is a view showing output signals from an encoder shown in FIG. 10.

By performing above processing, when the positional deviation is small, i.e. when the motor 1 is in a stationary condition, a ratio of sampling intervals between the positional deviation reading sampler 35 and the speed deviation reading sampler 36 becomes 1:1. Namely, the sampling interval of the positional deviation reading sampler 35 becomes identical with the sampling interval of the speed deviation reading sampler 36, as shown in FIGS. 8(A) and 8(B). On the other hand, when the positional deviation is large, i.e. when the motor 1 is in a moving condition, a ratio of sampling intervals between the positional deviation reading sampler 35 and the speed deviation reading sampler 36 becomes 3:1. Namely, the sampling interval of the positional deviation reading sampler 35 becomes three times as long as the sampling interval of the speed deviation reading sampler 36, as shown in FIGS. 9(A) and 9(B).

In this manner, when the motor is in a moving condition, it is preferable to set the sampling interval of the positional deviation reading sampler 35 to be three times or more compared with the sampling interval of the speed deviation reading sampler 36, so that the speed control can be performed without causing delay or time lag by fixing the speed command outputted from the position control calculator 40 during a time period equivalent to three consecutive samplings of the speed deviation reading sampler 36.

On the contrary, when the motor is in a stationary condition, it is preferable to set the sampling interval of the positional deviation reading sampler 35 to be identical with the sampling interval of the speed deviation reading sampler 36, so that the positioning operation of the motor 1 can be accurately and responsively performed by detecting even a small positional deviation at the shortest sampling interval equal to the sampling interval of the speed deviation reading sampler 36 to obtain the torque command.

The torque command outputted from the speed control calculator 43 is inputted into the multipliers 24U, 24W wherein the torque command is multiplied with the outputs from the magnetic pole detector 4. This magnetic pole detector 4 receives the signals detected by the encoder 2 through the pulse converter 3.

When the motor 1 rotates in the clockwise (CW) direction, the encoder 2 generates the A-phase signal 15 and the B-phase signal 16 having a mutual phase difference of 90 degrees therebetween as shown in FIG. 3, together with the Z-phase pulse signal 17 corresponding to one of zero-crossing points of the U-phase inductive voltage 12 as shown in FIG. 2. These A-phase signal 15 and B-phase signal 16 are, then, inputted into the pulse converter 3. These A-phase signal 15 and B-phase signal 16 are converted into the CW pulse signal 18 when the motor 1 rotates in the clockwise (CW) direction, and are converted into the CCW pulse signal 19 when the motor 1 rotates in the counter-clockwise (CCW) direction.

Next, the CW pulse signal 18 and the CCW pulse signal 19 outputted from the pulse converter 3, and the Z-phase signal 17 outputted from the encoder 2 are supplied to the magnetic pole detector 4. The counter 20 shown in FIG. 5 is counted up by the CW pulse signal 18 and counted down by the CCW pulse signal 19. Furthermore, the counter 20 is cleared to 0 by the Z-phase signal 17 fed from the encoder 2. Namely, an arrival of the designated zero-cross point of the U-phase inductive voltage 12 is known by checking the Z-phase signal 17. And, a displacement or shift amount of the motor 1 from the designated zero-cross point of the U-phase inductive voltage 12 is known from the count value of the counter 20. The count value of the counter 20 becomes the pointer 23 of the U-phase current phase command table 21 for outputting the phase value of the U-phase inductive voltage 12 corresponding to the present rotational position of the motor 1. Moreover, the count value of the counter 20 becomes the pointer 23 of the W-phase current phase command table 22 for outputting the phase value of the W-phase inductive voltage 14 corresponding to the present rotational position of the motor 1.

In the multipliers 24U, 24W, the phase values of the U-phase and W-phase inductive voltages 12 and 14 are multiplied with the torque command outputted from the speed control calculator 43. Namely, the multipliers 24U, 24W multiply the current amplitude command value with the U-phase and W-phase current phase command values, respectively. Resultant two outputs from respective multipliers 24U, 24W are, then, fed to two D/A converters 28U, 28W so as to generate U-phase and W-phase current commands, respectively. These U-phase and W-phase current commands are, subsequently, fed to current amplifiers 27U, 27W in which the drive currents to be supplied to the U-phase winding 7 and the W-phase winding 9 are generated in response to the U-phase and W-phase current commands, respectively.

On the other hand, the subtracter 28 obtains the current command for the V-phase winding 8 by calculating the value identical with −(U-phase current command +W-phase current command). Thus obtained V-phase current command is, thereafter, fed to the current amplifier 27V in which the drive current to be supplied to the V-phase winding 8 is generated in response to the V-phase current command.

If the torque command is a positive value, the motor 1 generates a torque in the clockwise (CW) direction. On the contrary, if the torque command is a negative value, the motor 1 generates a torque in the counterclockwise (CCW) direction because the multipliers 24U and 24W generate U-phase and W-phase current commands having 180-degree phase difference with respect to respective U-phase and W-phase current phase commands. Thus, the speed deviation is decreased. In accordance with the reduction of the speed deviation, the positional deviation becomes small.

As explained in the foregoing description, the motor drive apparatus in accordance with the present invention comprises a position control calculator 40 having a sampling interval switching function of switching a sampling interval of a positional deviation reading sampler 35 in accordance with a level of the positional deviation; a positional deviation level setter calculator 40 for setting a reference level of the positional deviation to switch the sampling interval; a sampling time setter 42 for setting a plurality of sampling times to be switched; and a speed control calculator 43 having a function of open-or-close controlling the positional deviation reading sampler 35 at the sampling interval switched.

Accordingly, it becomes possible to switch the sampling interval of the positional deviation reading sampler 35 between the moving and stationary conditions of the motor 1. Hence, the positioning of the motor 1 can be accurately and responsively performed regardless of the motor driving condition.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A motor drive apparatus comprising:

position detecting means for detecting an actual rotational position of a motor;

speed detecting means for detecting an actual rotational speed of said motor;

position control means for generating a speed command of said motor on the basis of a difference between a target rotational position inputted from an external means and the actual rotational position detected by said position detecting means;

speed control means for generating a torque command of said motor on the basis of a difference between said speed command generated from said position control means and said actual rotational speed detected by said speed detecting means;

driving means for driving said motor in accordance with said torque command generated from said speed control means; and changing means for changing a ratio of a frequency of generating said speed command to a frequency of generating said torque command in accordance with the actual rotational speed of the motor detected by said speed detecting means.

2. A motor drive apparatus comprising:

a motor for controlling a position of a movable object;

position detecting means for detecting an actual position of said movable object;

speed detecting means for detecting an actual speed of said movable object;

position control means for generating a speed command of said movable object on the basis of a difference between a target position inputted from an external means and the actual position detected by said position detecting means;

speed control means fop generating a torque command of said movable object on the basis of a difference between said speed command generated from said position control means and said actual speed detected by said speed detecting means;

driving means for driving said motor in accordance with said torque command generated from said speed control means; and changing means for changing a ratio of a frequency of generating said speed command to a frequency of generating said torque command in accordance with the actual speed of the movable object detected by said speed detecting means.

3. A motor drive apparatus comprising:

position detecting means for detecting an actual rotational position of a motor;

speed detecting means for detecting an actual rotational speed of said motor;

position control means for generating a speed command of said motor on the basis of a difference between a target rotational position inputted from an external means and the actual rotational position detected by said position detecting means;

speed control means for generating a torque command of said motor on the basis of a difference between said speed command generated from said position control means and said actual rotational speed detected by said speed detecting means;

driving means for driving said motor in accordance with said torque command generated from said speed control means; and changing means for changing a ratio of a frequency of generating said speed command to a frequency of generating said torque command in accordance with the difference between the target rotational position inputted from the external means and the actual rotational position detected by said position detecting means.

4. A motor drive apparatus comprising:

position detecting means for detecting an actual rotational position of a motor;

speed detecting means for detecting an actual rotational speed of said motor;

positional deviation calculating means for generating a positional deviation on the basis of a target rotational position inputted from an external means and the actual rotational position detected by said position detecting means;

position control means for generating a speed command of said motor by performing a predetermined calculation using said positional deviation generated from said positional deviation calculating means;

speed deviation calculating means for generating a speed deviation on the basis of said speed command generated from said position control means and said actual rotational speed detected by said speed detecting means;

speed control means for generating a torque command of said motor by performing a predetermined calculation using said speed deviation generated from said speed deviation calculating means;

driving means for driving said motor in accordance with said torque command generated from said speed control means; and changing means for changing a ratio of a frequency of generating said speed command to a frequency of generating said torque command in accordance with the positional deviation generated from said positional deviation calculating means.

5. A motor drive apparatus comprising:

position detecting means for detecting an actual rotational position of a motor;

speed detecting means for detecting an actual rotational speed of said motor;

positional deviation calculating means for generating a positional deviation on the basis of a target rotational position inputted from an external means and the actual rotational position detected by said position detecting means;

positional deviation outputting means for outputting said positional deviation generated from said positional deviation calculating means at predetermined intervals;

position control means for generating a speed command of said motor by performing a predetermined calculation using said positional deviation outputted through said positional deviation outputting means;

speed deviation calculating means for generating a speed deviation on the basis of said speed command generated from said position control means and said actual rotational speed detected by said speed detecting means;

speed deviation outputting means for outputting said speed deviation generated from said speed deviation calculating means at predetermined intervals;

speed control means for generating a torque command of said motor by performing a predetermined calculation using said speed deviation outputted through said speed deviation outputting means;

driving means for driving said motor in accordance with said torque command generated from said speed control means; and changing means for changing a ratio of the interval of outputting said positional deviation through said positional deviation outputting means to the interval of outputting said speed deviation through said speed deviation outputting means in accordance with the positional deviation generated from said positional deviation calculating means.

6. A motor drive apparatus in accordance with claim 5, wherein said changing means adjusts the interval of outputting said positional deviation through said positional deviation outputting means to be substantially equal to the interval of outputting said speed deviation through said speed deviation outputting means when the positional deviation generated from said positional deviation calculating means is smaller than a predetermined reference value, and further adjusts the interval of outputting said positional deviation through said positional deviation outputting means to be longer than the interval of outputting said speed deviation through said speed deviation outputting means when the positional deviation generated from said positional deviation calculating means is larger than the predetermined reference value.

7. A motor drive apparatus in accordance with claim 5, wherein said changing means adjusts the interval of outputting said positional deviation through said positional deviation outputting means to be equal to the interval of outputting said speed deviation through said speed deviation outputting means when the positional deviation generated from said positional deviation calculating means is smaller than a predetermined reference value, and further adjusts the interval of outputting said positional deviation through said positional deviation outputting means to be three times as long as the interval of outputting said speed deviation through said speed deviation outputting means when the positional deviation generated from said positional deviation calculating means is larger than the predetermined reference value.

8. A motor drive apparatus comprising:

position detecting means for detecting an actual rotational position of a plural-phase motor;

speed detecting means for detecting an actual rotational speed of said motor;

magnetic pole detecting means for detecting magnetic pole of said motor on the basis of the actual rotational position generated from said position detecting means;

positional deviation calculating means for generating a positional deviation on the basis of a target rotational position inputted from an external means and the actual rotational position detected by said position detecting means;

positional deviation outputting means for outputting said positional deviation generated from said positional deviation calculating means at predetermined intervals;

position control means for generating a speed command of said motor by performing a predetermined calculation using said positional deviation outputted through said positional deviation outputting means;

speed deviation calculating means for generating a speed deviation on the basis of said speed command generated from said position control means and said actual rotational speed detected by said speed detecting means;

speed deviation outputting means for outputting said speed deviation generated from said speed deviation calculating means at predetermined intervals;

speed control means for generating a torque command of said motor by performing a predetermined calculation using said speed deviation outputted through said speed deviation outputting means;

driving means for supplying driving current to said motor in accordance with said torque command generated from said speed control means and an output from said magnetic pole detecting means; and changing means for changing a ratio of the interval of outputting said positional deviation through said positional deviation outputting means to the interval of outputting said speed deviation through said speed deviation outputting means in accordance with the positional deviation generated from said positional deviation calculating means.

9. A motor drive apparatus in accordance with claim 8, wherein said changing means adjusts the interval of outputting said positional deviation through said positional deviation outputting means to be substantially equal to the interval of outputting said speed deviation through said speed deviation outputting means when the positional deviation generated from said positional deviation calculating means is smaller than a predetermined reference value, and further adjusts the interval of outputting said positional deviation through said positional deviation outputting means to be longer than the interval of outputting said speed deviation through said speed deviation outputting means when the positional deviation generated from said positional deviation calculating means is larger than the predetermined reference value.

10. A motor drive apparatus in accordance with claim 8, wherein said changing means adjusts the interval of outputting said positional deviation through said positional deviation outputting means to be equal to the interval of outputting said speed deviation through said speed deviation outputting means when the positional deviation generated from said positional deviation calculating means is smaller than a predetermined reference value, and further adjusts the interval of outputting said positional deviation through said positional deviation outputting means to be three times as long as the interval of outputting said speed deviation through said speed deviation outputting means when the positional deviation generated from said positional deviation calculating means is larger than the predetermined reference value.

11. A motor controlling method comprising steps of:

generating a speed command of a motor on the basis of a difference between a target rotational position inputted from an external means and an actual rotational position;

generating a torque command of said motor on the basis of a difference between said speed command and an actual rotational speed;

driving said motor in accordance with said torque command; and changing a ratio of a frequency of generating said speed command to a frequency of generating said torque command in accordance with the actual rotational speed of said motor.

12. A motor controlling method comprising steps of:

generating a speed command of a movable object to be moved by a motor on the basis of a difference between a target position of said movable object and an actual position;

generating a torque command of said movable object on the basis of a difference between said speed command and an actual speed;

driving said motor in accordance with said torque command; and changing a ratio of a frequency of generating said speed command to a frequency of generating said torque command in accordance with the actual speed of said movable object.

13. A motor drive apparatus comprising:

position detecting means for detecting an actual rotational position of a motor;

speed detecting means for detecting an actual rotational speed of said motor;

position control means for generating a speed command of said motor at a frequency based on a difference between a target rotational position inputted from an external means and the actual rotational position detected by said position detecting means;

speed control means for generating a torque command of said motor at a frequency based on a difference between said speed command generated from said position control means and said actual rotational speed detected by said speed detecting means;

driving means for driving said motor in accordance with said torque command generated from said speed control means; and changing means for changing said frequency at which said speed command is generated relative to said frequency at which said torque command is generated in accordance with the actual rotational speed of the motor detected by said speed detecting means.

14. A motor controlling method comprising steps of:

generating a speed command of a motor at a frequency based on a difference between a target rotational position inputted from an external means and an actual rotational position;

generating a torque command of said motor at a frequency based on a difference between said speed command and an actual rotational speed;

driving said motor in accordance with said torque command; and changing said speed command frequency relative to said torque command frequency in accordance with the actual rotational speed of said motor.

* * * * *